United States Patent
Kakefuda et al.

(10) Patent No.: US 11,867,567 B2
(45) Date of Patent: Jan. 9, 2024

(54) THERMO-PHYSICAL PROPERTY MEASUREMENT INSTRUMENT AND THERMO-PHYSICAL PROPERTY MEASUREMENT METHOD

(71) Applicants: NETZSCH Japan K.K., Yokohama (JP); NATIONAL INSTITUTE FOR MATERIALS SCIENCE, Tsukuba (JP)

(72) Inventors: Yohei Kakefuda, Yokohama (JP); Susumu Kawakami, Yokohama (JP); Tetsuya Baba, Tsukuba (JP); Takao Mori, Tsukuba (JP)

(73) Assignees: NETZSCH Japan K.K., Yokohama (JP); NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 96 days.

(21) Appl. No.: 17/596,800

(22) PCT Filed: Dec. 4, 2019

(86) PCT No.: PCT/JP2019/047422
§ 371 (c)(1),
(2) Date: Dec. 17, 2021

(87) PCT Pub. No.: WO2020/255447
PCT Pub. Date: Dec. 24, 2020

(65) Prior Publication Data
US 2022/0316959 A1    Oct. 6, 2022

(30) Foreign Application Priority Data

Jun. 20, 2019    (JP) .................................. 2019-114439

(51) Int. Cl.
*G01K 11/12*    (2021.01)
*G01N 25/18*    (2006.01)

(52) U.S. Cl.
CPC ............. *G01K 11/12* (2013.01); *G01N 25/18* (2013.01)

(58) Field of Classification Search
CPC .............................. G01K 11/12; G01N 25/18
(Continued)

(56) References Cited

U.S. PATENT DOCUMENTS 5,376,793 A    12/1994 Lesniak
5,828,457 A    10/1998 Tabata et al.
(Continued)

FOREIGN PATENT DOCUMENTS

CN        113008929 A    *    6/2021
CN        115112708 A    *    9/2022
(Continued)

OTHER PUBLICATIONS

International Search Report and Written Opinion of the International Searching Authority; Application No. PCT/JP2019/047422; Completed: Feb. 7, 2020; dated Feb. 25, 2020; 7 Pages.
(Continued)

*Primary Examiner* — Mirellys Jagan
(74) *Attorney, Agent, or Firm* — Whitmyer IP Group LLC

(57) ABSTRACT

In a thermo-physical property measurement instrument, a light shield that shields from light except for an aperture is provided facing the front surface of a sample thin film of a sample. Heating light of repeated pulse that is output from a heating laser irradiates the sample thin film through the light shield. Temperature measurement light of continuous light that is output from a temperature measurement laser is applied to a measurement position a predetermined distance away from a heating light irradiation position on the sample thin film. A photodetector detects reflected light of the temperature measurement light off the sample thin film, and a computer acquires a thermo-reflectance signal that was
(Continued)

digitally converted by an AD converter. The computer calculates a thermo-physical property value in the in-plane direction of the sample thin film of the sample on the basis of the acquired thermo-reflectance signal.

16 Claims, 15 Drawing Sheets

(58) Field of Classification Search
USPC .......................................................... 374/120
See application file for complete search history.

(56) References Cited

U.S. PATENT DOCUMENTS

| | | | |
|---|---|---|---|
| 2008/0102533 | A1 | 5/2008 | Kim |
| 2021/0080415 | A1* | 3/2021 | Baba .................. G01N 25/18 |

FOREIGN PATENT DOCUMENTS

| | | | | |
|---|---|---|---|---|
| EP | 0124224 | A2 * | 11/1984 | |
| EP | 459392 | A2 | 12/1991 | |
| EP | 3051278 | A1 | 8/2016 | |
| JP | S6250652 | A | 3/1987 | |
| JP | H03189547 | A | 8/1991 | |
| JP | H0662356 | U | 9/1994 | |
| JP | H7270327 | A | 10/1995 | |
| JP | 2000121585 | A * | 4/2000 | ............. G01K 11/00 |
| JP | 3252155 | B2 | 1/2002 | |
| JP | 3376082 | B2 | 2/2003 | |
| JP | 2003322628 | A | 11/2003 | |
| JP | 2007279060 | A | 10/2007 | |
| JP | 2011145138 | A | 7/2011 | |
| JP | 4817328 | B2 | 11/2011 | |
| JP | 5403618 | B2 | 1/2014 | |
| KR | 20070025895 | A * | 3/2007 | |
| KR | 100821508 | B1 | 4/2008 | |
| KR | 1020140080962 | A | 7/2014 | |

OTHER PUBLICATIONS

Extended European Search Report; Application No. 19934244.5; Completed: May 4, 2023; dated May 12, 2023; 7 Pages.

* cited by examiner

THERMO-PHYSICAL PROPERTY MEASUREMENT INSTRUMENT AND THERMO-PHYSICAL PROPERTY MEASUREMENT METHOD

TECHNICAL FIELD

The present disclosure relates to a thermo-physical property measurement instrument and a thermo-physical property measurement method that are used for measuring a thermo-physical property value.

BACKGROUND

To evaluate a thermo-physical property of a thin film, it is necessary to measure temperature changes of the sample surface as fast as possible since the time of heat diffusion in the film thickness direction of the thin film depends on the thermal diffusivity and film thickness of the thin film. The method for measuring a thermo-physical property value of a thin film includes one called a thermo-reflectance method, in which a surface of a thin film sample is heated by a pulsed laser, then, irradiated with a temperature measurement laser beam; a thermo-physical property value is calculated based on the reflected light of the temperature measurement laser beam off the thin film surface (for example, Patent Literature 1).

In the thermo-reflectance method, in order to measure a temperature change on the front surface or rear surface of a thin film, the thin film is irradiated with a laser beam for measuring a temperature to detect a change in the reflectance of the laser beam. When the temperature change of the thin film is as small as within several degrees Celsius, the amount of temperature increase is considered to be proportional to the amount of change in reflectance, thus, the temperature change on the sample surface can be detected based on the change in reflectance.

By using pulsed light having a pulse width on the order of nanoseconds or smaller as heating light and temperature measurement light, a temperature history curve of a thin film sample having a film thickness of several nanometers to several tens of micrometers can be obtained with the starting point set at the irradiation position of the heating light. Then, by analyzing the temperature history curve using a heat conduction equation, it is possible to calculate thermo-physical property values including a thermal diffusivity and an interfacial thermal resistance of the sample (for example, Patent Literature 2).

Here, when the optical path difference between the temperature measurement light and the heating light changes, the relative irradiation positions of these rays of light change, restricting the range of time that can be accurately measured. To deal with this problem, the method described in Patent Literature 2 electrically controls drive signals for heating laser and temperature measurement laser by a signal generator to control the arrival time of the heating light and the temperature measurement light on the sample. Patent Literature 2 explains that this enables measurement over a wider time range and expanding a measurement target range.

As for the method for analyzing a temperature history curve, Patent Literature 1 obtains a thermo-physical property value by constructing an analysis model on an assumption of a heat flow that is one-dimensionally transmitted in a direction perpendicular to the front surface of the thin film. Patent Literature 1 explains that this makes it possible to accurately analyze a thermal response in the film thickness direction of a multilayer thin film and a functionally graded material.

On the other hand, the thermo-reflectance method is also used to evaluate a thermo-physical property in an in-plane direction of a thin film (for example, Patent Literature 3). In measuring a temperature change in the in-plane direction, it is necessary to specify the irradiation positions of heating light and temperature measurement light with high accuracy. The thermo-physical property measurement device described in Patent Literature 3 scans the irradiation position of the temperature measurement light on a sample surface by moving an XY stage on which the sample is fixed while fixing the irradiation position of the heating light on the sample surface. Patent Literature 3 explains that this allows to obtain a thermal diffusivity in the in-plane direction, as well as, an image of heat diffusion centering on a heated position.

CITATION LIST

Patent Literature

Patent Literature 1: Japanese Patent No. 3252155
Patent Literature 2: Unexamined Japanese Patent Application Publication No. 2003-322628
Patent Literature 3: Unexamined Japanese Patent Application Publication No. 2011-145138

SUMMARY

Technical Problem

In evaluation of a thermo-physical property in an in-plane direction as described in Patent Literature 3, when heat is applied by irradiating a thin film with heating light, the heat diffuses not only in the in-plane direction but also toward the rear surface in a direction perpendicular to the front surface of the thin film that is the irradiation surface. Further, compared to a thin plate sample, a thin film sample is vulnerable to damage by heating light, which limits the output of the heating light. With this limitation, a temperature rise on the front surface of a thin film at a measurement position that is a certain distance away in the in-plane direction from a heating position is expected to be extremely small as the distance increases. In such a case, there is a problem that accurate evaluation is difficult since a signal with a sufficient signal-to-noise (S/N) ratio may not be detected.

When the temperature rise is small, the measurement position to which the temperature measurement light is applied needs to be slightly displaced from the irradiation area of the heating light. However, the heating light has a spatial intensity distribution. Thus, it is difficult to strictly distinguish between the irradiation area and the non-irradiation area of the heating light. In addition, a complex mechanism is required to accurately measure the displacement amount of the temperature measurement light relative to the heating light and the measurement is not easy.

The present disclosure is made in view of the above-described conditions. An objective of the present disclosure is to provide a thermo-physical property measurement instrument and a thermo-physical property measurement method that can accurately and easily measure a thermo-physical property value in the in-plane direction of a thin film.

Solution to Problem

To achieve the above objective, a thermo-physical property measurement instrument according to a first aspect of the present disclosure includes:
- a light shield that includes an aperture and is provided facing the front surface or rear surface of a sample thin film and shields from light except for the aperture;
- a heating laser that irradiates the sample thin film with repeated pulsed heating light through the light shield;
- a temperature measurement laser that applies temperature measurement light to a measurement position that is a predetermined distance away in an in-plane direction along an extending direction of the front surface from a heating light irradiation position on the sample thin film irradiated with the heating light through the aperture;
- a photodetector that detects reflected light of the temperature measurement light off the sample thin film; and
- a thermo-physical property value calculator that calculates a thermo-physical property value in the in-plane direction of the sample thin film based on a reflected light intensity of the reflected light detected by the photodetector.

The diameter of a spot of the heating light applied to the light shield may be larger than the diameter of a spot of the temperature measurement light on the sample thin film, the center of the spot of the heating light and the center of the spot of the temperature measurement light may be at the same position in the in-plane direction, and the temperature measurement position may be separated from the heating light irradiation position by a predetermined distance by shifting the aperture of the light shield from the center of the spot of the heating light and the center of the spot of the temperature measurement light.

The light shield may be formed by depositing a light-shielding thin film having a light shielding property except for the aperture on a transparent substrate made of a material that transmits the heating light, the light-shielding thin film on the transparent substrate may be positioned to face the front surface of the sample thin film, and the heating laser may irradiate the side of the transparent substrate with the heating light.

The sample thin film may be a thin film deposited on a sample substrate, the light shield may be formed by depositing a light-shielding thin film having a light shielding property on a transparent substrate except for the aperture, the light-shielding thin film on the transparent substrate may be positioned to face a surface of the sample substrate opposite to the sample thin film, and the heating laser may irradiate the side of the transparent substrate with the heating light.

The light shield may be formed by depositing a light-shielding thin film having a light shielding property on the front surface of the sample thin film, and the heating laser may irradiate the light shield on the front surface of the sample thin film with the heating light.

The sample thin film may be a thin film formed on a sample substrate, the light shield may be formed by depositing a light-shielding thin film having a light shielding property on a rear surface of the sample substrate opposite to the sample thin film, and the heating laser may irradiate the light shield on the rear surface of the sample substrate with the heating light.

The thermo-physical property value calculator may calculate heat diffusion time of the sample thin film from the heating light irradiation position to the measurement position based on the reflected light intensity, and may calculate the thermo-physical property value including a thermal diffusivity based on the heat diffusion time.

The temperature measurement light may be focused and applied to the measurement position located on a surface of the sample thin film opposite to the light shield.

The light shield may have two or more apertures separated from each other, the heating light and the temperature measurement light may be both applied to the sample thin film through the light shield, the heating light may be applied to a region including at least one of the apertures, and the temperature measurement light may be focused and applied to the measurement position at the same position in the in-plane direction as another one of the apertures.

The measurement position may be changed by moving a stage on which the sample thin film including the light shield is fixed in a two-dimensional direction parallel to the in-plane direction, and the thermo-physical property value calculator may calculate the thermo-physical property value in the in-plane direction based on the reflected light intensity reflected off the measurement position.

The heating light may be pulsed light having a pulse width on the order of nanoseconds, picoseconds or femtoseconds.

The temperature measurement light may be continuous light.

The temperature measurement light may be pulsed light having a pulse width on the order of nanoseconds, picoseconds or femtoseconds.

The thermo-physical property measurement instrument may further include a signal generator that outputs a drive signal to the heating laser and the temperature measurement laser, in which the thermo-physical property measurement instrument may control heating light irradiation time to irradiate the sample thin film with the heating light and temperature measurement light irradiation time to irradiate the sample thin film with the temperature measurement light using a drive signal of the signal generator, and the thermo-physical property value calculator may calculate heat diffusion time based on a time difference between the heating light irradiation time and the temperature measurement light irradiation time and calculate the thermo-physical property value including a thermal diffusivity based on the heat diffusion time.

The light shield may have a light-shielding thin film of a metal material that is deposited except for the aperture.

Further, a thermo-physical property measurement method according to a second aspect of the present disclosure includes:
- a heating light irradiation step for irradiating a sample thin film with repeated pulsed heating light through a light shield that includes an aperture and is provided facing the front surface or rear surface of the sample thin film and shields from light except for the aperture;
- a temperature measurement light irradiation step for applying temperature measurement light to a measurement position that is a predetermined distance away in an in-plane direction along an extending direction of the front surface from a heating light irradiation position on the sample thin film irradiated with the heating light through the aperture;
- a light detection step for detecting reflected light of the temperature measurement light off the sample thin film; and
- a thermo-physical property value calculation step for calculating a thermo-physical property value in the in-plane direction of the sample thin film based on the reflected light intensity of the reflected light detected at the light detection step.

Advantageous Effects of Invention

According to the present disclosure, a thermo-physical property value in the in-plane direction of a sample thin film can be accurately and easily measured by applying heating light through an aperture provided in a light shield to accurately identify a distance between a heating light irradiation position and a temperature measurement light irradiation position.

DETAIL DESCRIPTION

Embodiment 1

Figure 1:
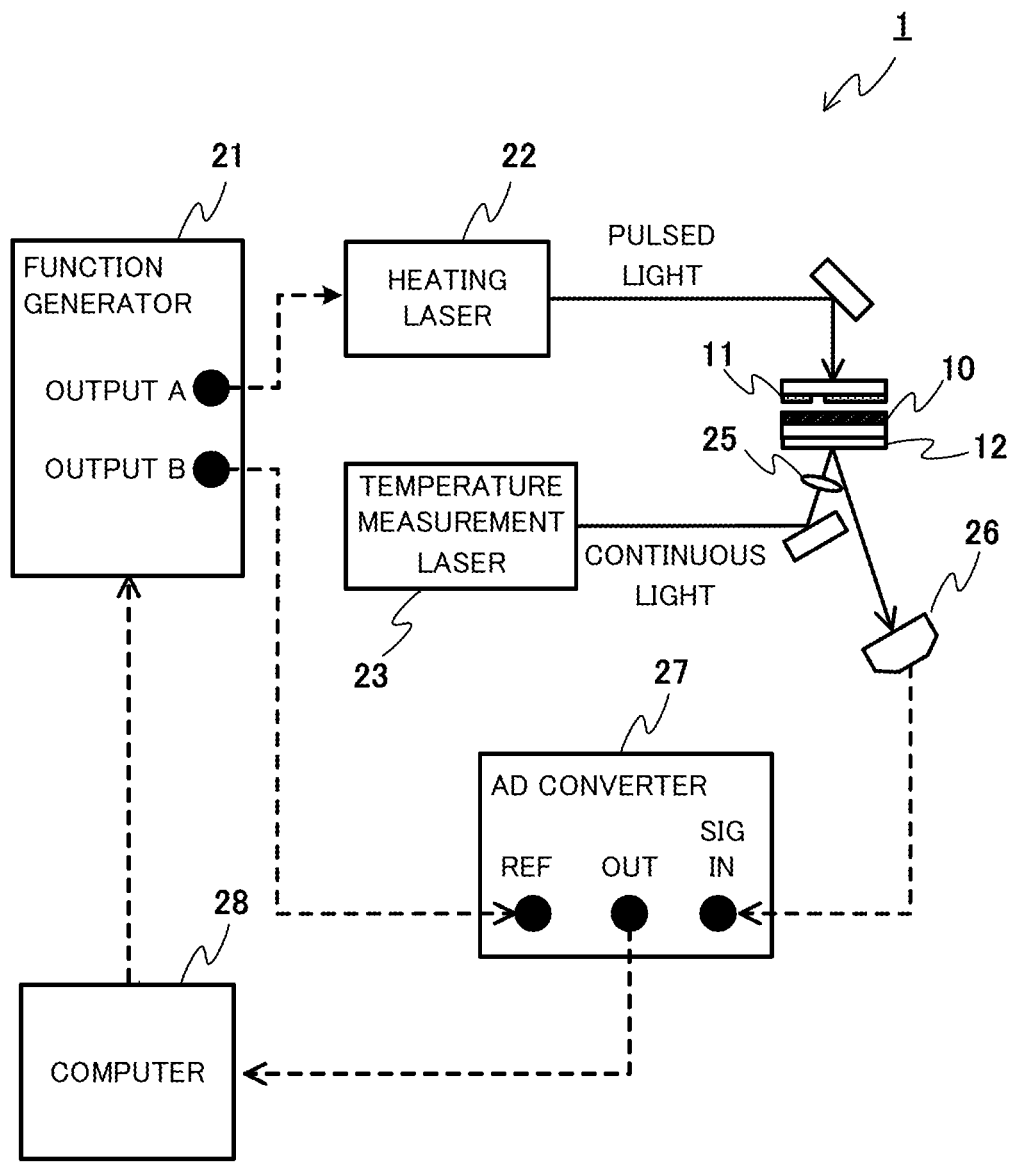
FIG. 1 is a diagram illustrating the configuration of a thermo-physical property measurement instrument according to Embodiment 1 of the present disclosure.

The embodiments of the present disclosure will be described in detail with reference to the drawings. FIG. 1 is a diagram illustrating the configuration of a thermo-physical property measurement instrument 1 according to the embodiments of the present disclosure. In the present embodiment, the thermo-physical property measurement instrument 1 measures a temperature response using a thermo-reflectance method that irradiates the front surface of a sample 10 with heating light, which is pulsed light, then, irradiates the rear surface with temperature measurement light, which is continuous light, and detects the reflected light of the temperature measurement light.

As illustrated in FIG. 1, the thermo-physical property measurement instrument 1 includes a function generator (FG) 21 that outputs a signal of an arbitrary function, a heating laser 22 that outputs heating light for heating a sample 10, and a temperature measurement laser 23 that outputs temperature measurement light for detecting temperature. The thermo-physical property measurement instrument 1 further includes a lens 25 that focuses temperature measurement light, an XY stage 12 that moves the sample 10 and a light shield 11, and a photodetector 26 that detects the reflected light of the focused temperature measurement light off the sample 10. Furthermore, the thermo-physical property measurement instrument 1 includes an AD converter (Analog to Digital Converter) 27 that converts a detected signal of the photodetector 26 from analog to digital, and a computer 28 that calculates a thermo-physical property value based on the output signal of the AD converter 27.

Figure 2A:
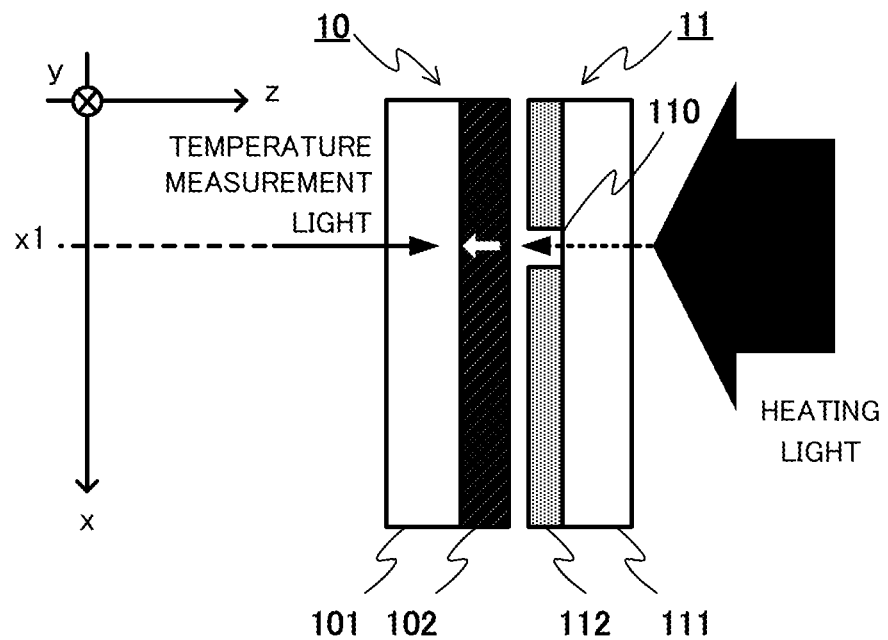
FIG. 2A is a diagram illustrating heating light and temperature measurement light applied to a sample and a light shield in Embodiment 1.
Figure 2B:
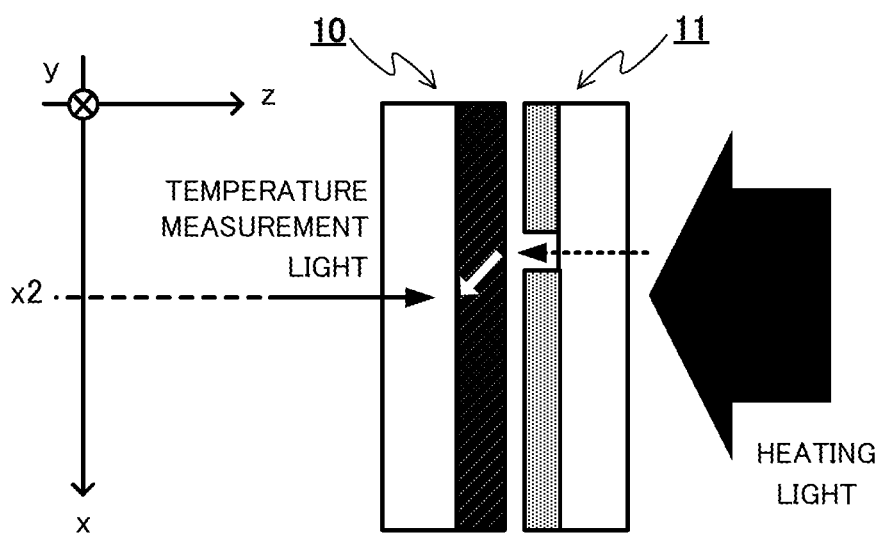
FIG. 2B is a diagram illustrating heating light and temperature measurement light applied to a sample and a light shield in Embodiment 1.
Figure 2C:
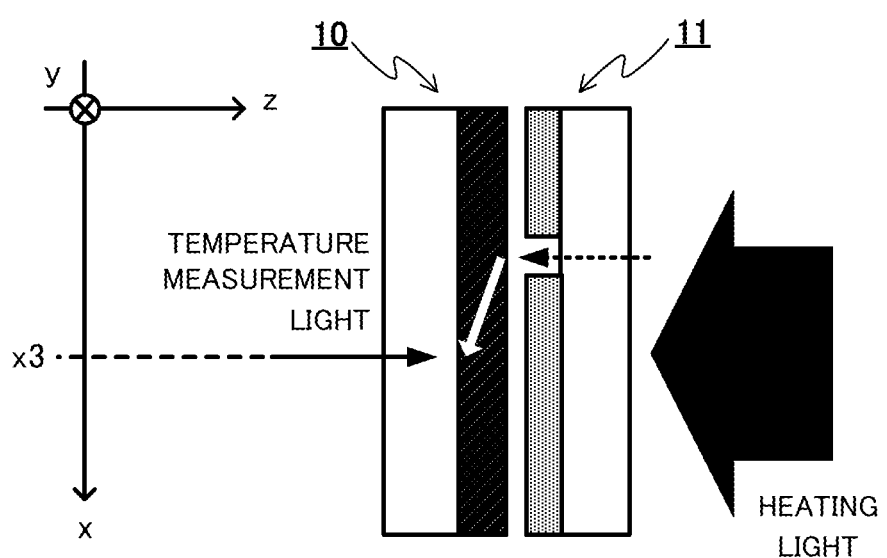
FIG. 2C is a diagram illustrating heating light and temperature measurement light applied to a sample and a light shield in Embodiment 1.

FIGS. 2A, 2B, and 2C are diagrams representing a sample 10, a light shield 11 that is arranged to face the sample 10, and heating light and temperature measurement light to be applied to the sample 10 and the light shield 11. FIGS. 2A, 2B, and 2C differ from each other in the position where the temperature measurement light is applied. The sample 10 includes a sample substrate 101 and a sample thin film 102 deposited on the sample substrate 101. The sample substrate 101 is made of a material that transmits heating light or temperature measurement light. The sample thin film 102 is made of an arbitrary material of a measurement subject, of which thermo-physical property value is to be measured. In FIGS. 2A, 2B, and 2C, an in-plane direction in which the front and rear surfaces of the sample 10 and the light shield 11 extend is called the x direction and y direction, and a film thickness direction perpendicular to the in-plane direction is called the z direction.

The light shield 11 has a function of shielding from light except for an aperture 110. The light shield 11 includes a transparent substrate 111 and a light-shielding thin film 112 that is formed by depositing an arbitrary substance having a light shielding property on the transparent substrate 111, where the light-shielding thin film 112 is, for example, a thin film of a metal material such as platinum. The transparent substrate 111 is made of a material that transmits heating light and temperature measurement light. The aperture 110 is, for example, a slit having a predetermined width. The light shield 11 is generated by an arbitrary conventional method. For example, the light shield 11 may be generated by generating a metal thin film on the transparent substrate 111 by a metal vapor deposition method, patterning the metal thin film by photolithography, and etching an aperture 110. The aperture 110 has a predetermined shape and size, and is sufficiently smaller than the circle of the spot of heating light. The light-shielding thin film 112 may be arranged in contact with the sample thin film 102.

The heating light and temperature measurement light applied to the sample 10 and the light shield 11 each have the center of the spot at the same position in the in-plane direction. The temperature measurement light is sufficiently focused by the lens 25 before applied to the sample substrate 101. The diameter of the spot of the heating light applied to the light shield 11 is sufficiently larger than the diameter of the spot of the temperature measurement light applied to the sample substrate 101. By driving the XY stage 12 in a two-dimensional direction while maintaining the centers of the spots of the heating light and the temperature measurement light at the same position in the in-plane direction, the positions of the sample 10 and the light shield 11 move in the x direction or y direction. FIGS. 2A, 2B, and 2C illustrate cases when the positions of the sample 10 and the light shield 11 are moved in the x direction.

As illustrated in FIGS. 2A, 2B, and 2C, when the sample 10 and the light shield 11 are moved by a distance smaller than the radius of the spot of the heating light, the irradiation position of the heating light on the sample thin film 102 stays the same since the heating light is applied through the aperture 110. On the other hand, the irradiation position of the temperature measurement light changes by the moved distance. In this way, by moving the sample 10 and the light shield 11, the distance between the irradiation position of the heating light and the irradiation position of the temperature measurement light can be changed. Note that the diameter of the spot of the temperature measurement light needs to be sufficiently small to be able to distinguish a change in distance between the irradiation position of the heating light and the irradiation position of the temperature measurement light. For example, the lens 25 focuses the spot of the temperature measurement light on the sample thin film 102 to a size smaller than a circle of 3 µm in diameter.

The function generator 21 of the thermo-physical property measurement instrument 1 outputs an electrical signal to the heating laser 22 for causing the heating laser 22 to output pulsed light on the order of nanoseconds. In the present embodiment, the pulse width of pulsed light output by the heating laser 22 is about 1 ns, and the repetition period is 20 µs. The signal output by the function generator 21 has a frequency of 50 kHz, which result in having the repetition period of 20 µs. An electrical signal that is input to the heating laser 22 from the function generator 21 can be controlled with regard to the output timing in a time interval of one period and can be set by the setting panel of the function generator 21 or an externally connected computer 28. The output timing of an electrical signal that is input to the heating laser 22 is output to the AD converter 27 and is used for timing control of AD (Analog to Digital) conversion.

The heating laser 22 is a fiber laser that outputs pulsed light of 1 ns in pulse width according to an electrical signal that is input from the function generator 21. The heating light that is output from the heating laser 22 is applied to a surface of the transparent substrate 111 opposite to the light-shielding thin film 112. The temperature measurement light that is output from the temperature measurement laser 23 is focused by the lens 25 and applied to a surface of the sample thin film 102 opposite to the light shield 11.

Here, the sample 10 and the light shield 11 are integrally fixed to the XY stage 12. By moving the XY stage 12, the irradiation position of the temperature measurement light is changed with reference to the sample 10 and the light shield 11. The irradiation position of the temperature measurement light is accurately set by observing the position with a CCD microscope or the like.

The photodetector 26 is a detector, for example, a photodiode, that receives the reflected light of temperature measurement light and converts the reflected light into an electrical signal. The AD converter 27 converts the detected signal that was photoelectrically converted by the photodetector 26 from analog to digital. The computer 28 performs processing for analyzing the digital signal that was output from the AD converter 27 and calculating a thermo-physical property value. As such, the computer 28 functions as a thermo-physical property value calculator.

The operation of the thermo-physical property measurement instrument 1 configured as above will be described below. As shown in FIGS. 2A to 2C, the thermo-physical property measurement instrument 1 according to the present embodiment performs measurement in a front heating/rear detection (FR) configuration in which heating light is applied to the front surface of the sample thin film 102 of the sample 10 through the light shield 11 and temperature measurement light is applied to the rear surface of the sample thin film 102.

An electrical signal with a repetition period of 20 µs is output from each of the output A and output B terminals of the function generator 21. The output signal of the output B has a certain delay to the output signal of the output A, and is output to the AD converter 27. Based on the electrical signal that was output from the output A of the function generator 21, the heating laser 22 outputs heating light with a pulse width of 1 ns and a repetition period of 20 µs.

The heating light that was output from the heating laser 22 proceeds toward the light-shielding thin film 112 through the transparent substrate 111. Then, only the heating light that has passed through the aperture 110 of the light-shielding thin film 112 is applied to the front surface of the sample thin film 102. Therefore the center of the irradiation area of the heating light is the center of the aperture 110. As the heating light passes through the aperture 110 of the light-shielding thin film 112, the irradiation area on the sample thin film 102 becomes smaller. The temperature of the irradiation area of the heating light on the sample thin film 102 instantly rises, and then the heat diffuses inside the sample thin film 102.

Whereas, the temperature measurement laser 23 outputs temperature measurement light that is continuous light. The temperature measurement light is focused by the lens 25, penetrates the sample substrate 101, and is applied to the rear surface of the sample thin film 102. Since the reflectance of the temperature measurement light is proportional to a temperature change, the thermo-physical property measurement instrument 1 observes a change in the temperature of the rear surface of the sample thin film 102 based on a change in the reflectance of the temperature measurement light. Temperature change caused by one pulse of the heating light is approximately 0.1° C.

Here, as illustrated in FIGS. 2A, 2B, and 2C, the center of the spot of the heating light that is applied to the light-shielding thin film 112 and the center of the spot of the temperature measurement light that is applied to the sample thin film 102 are at the same position in the in-plane direction. The sample 10 and the light shield 11 are moved by driving the XY stage 12 while maintaining the centers of the spots of the heating light and the temperature measurement light at the same position in the in-plane direction. Note that the following will describe a case where the XY stage is driven only in the x direction.

For example, as illustrated in FIG. 2A, when the centers of the spots of the heating light and the temperature measurement light coincide with the center of the aperture, the center of the irradiation area of the heating light on the front surface of the sample thin film 102 and a temperature measurement position on the rear surface are both x1, the same in the x direction, the heat propagation direction to be observed is only the film thickness direction indicated by the white arrow.

Next, as illustrated in FIG. 2B, when the XY stage 12 is moved by a distance of (x2−x1) in the x direction, the center of the irradiation area of the heating light on the front surface of the sample thin film 102 is displaced from a temperature measurement position on the rear surface thereof in the x direction. The distance between the center of the irradiation area of the heating light and the temperature measurement position in the x direction is (x2−x1). Therefore, the heat propagation direction to be observed is a synthesis direction, as indicated by the white arrow, in which a component in the film thickness direction and a component in the in-plane direction are combined.

Further, as illustrated in FIG. 2C, when the XY stage 12 is moved by a distance of (x3−x2) in the x direction, the center of the irradiation area of the heating light on the front surface of the sample thin film 102 is displaced from a temperature measurement position on the rear surface in the x direction. The distance between the center of the irradiation area of the heating light and the temperature measurement position in the x direction is (x3−x1). Therefore, the heat propagation direction to be observed is a synthesis direction, as indicated by the white arrow, in which a component in the film thickness direction and a component in the in-plane direction are combined. Here, since a component in the film thickness direction is obtained by measurement when the temperature measurement position is x1 as in FIG. 2A, a component in the in-plane direction can be obtained from measurement in the synthesis direction.

In this way, the temperature measurement position can be changed to x1, x2 or x3. Note that, although the case where the XY stage 12 is moved only in the x direction is described in the present embodiment, a stage that can move in a three-dimensional direction may also be used. The same applies to Embodiments 2 and 3.

The reflected light of the temperature measurement light is incident in the photodetector 26 and converted into an electrical signal. The detected signal that was output from the photodetector 26 is input into the AD converter 27. The thermo-reflectance signal that was output from the AD converter 27 is transmitted to the computer 28 as a temperature response signal. The computer 28 can calculate the thermo-physical property value of the sample thin film 102 by analyzing the received thermo-reflectance signal.

Figure 3:
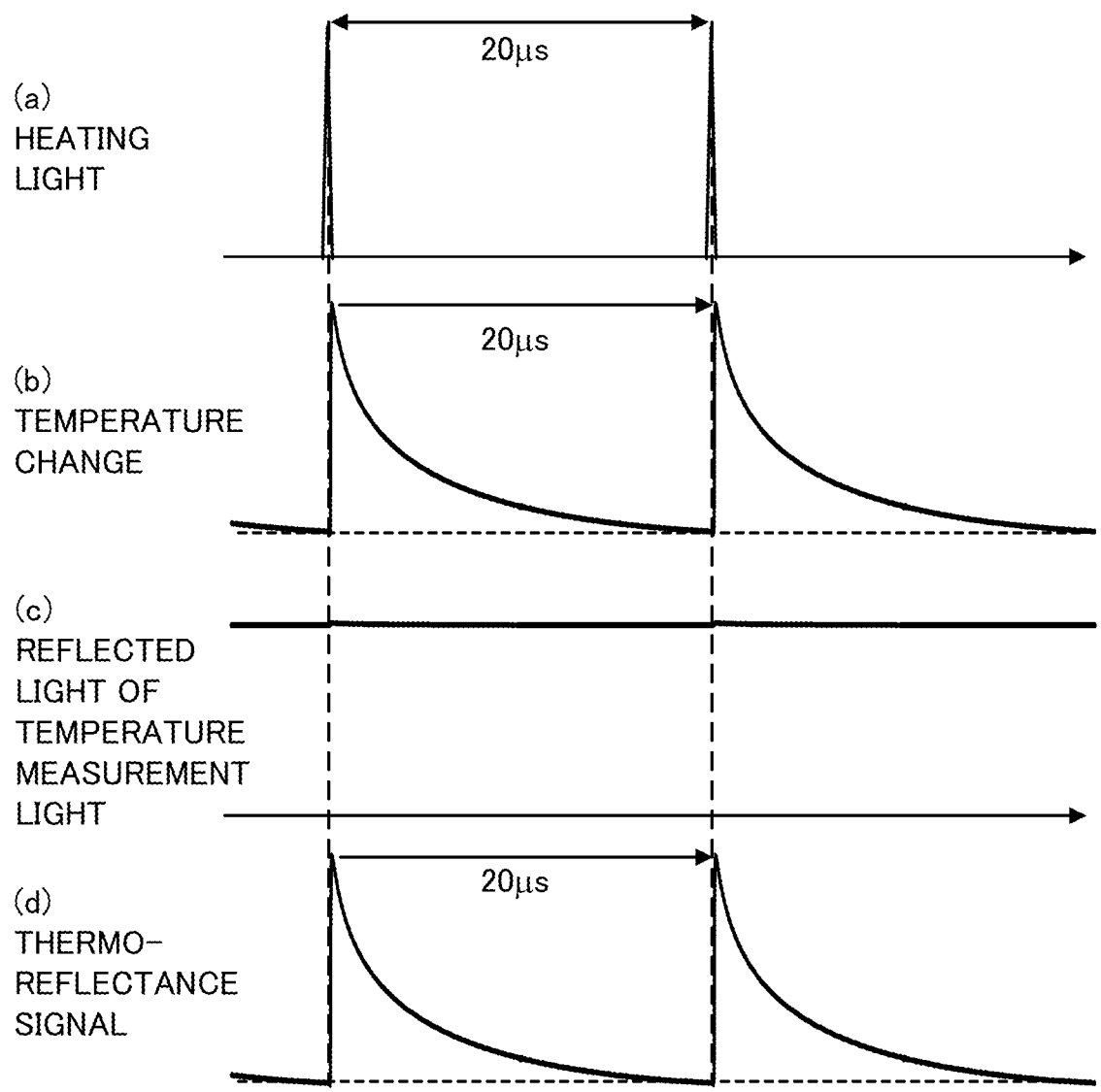
FIG. 3 is a timing chart illustrating the timings of heating light, temperature changes, reflected light of temperature measurement light, and thermo-reflectance signals.

The temperature response to heating by pulsed light will be described with reference to FIG. 3. FIG. 3 is a timing chart illustrating the timings of heating light, temperature changes, reflected light of temperature measurement light, and thermo-reflectance signals. When the front surface of the sample thin film 102 is irradiated with heating light of pulsed light as illustrated in section (a) of FIG. 3, the temperature of the front surface of the sample thin film 102 changes in coordination with the repetition period of the pulsed light as illustrated in section (b) of FIG. 3. On the other hand, the temperature measurement light, which is continuous light, is reflected off the rear surface of the sample thin film 102 with a reflectance proportional to a temperature change, thus, the intensity of the reflected light changes as illustrated in section (c) of FIG. 3.

The thermo-reflectance signal obtained by converting the reflected light into an electrical signal by the photodetector 26 and then AD-converting the electrical signal by the AD converter 27 is illustrated in section (d) of FIG. 3. The thermo-reflectance signal, which is a temperature response signal thus obtained, is transmitted from the AD converter 27 to the computer 28. The computer 28 can calculate a thermo-physical property value of the sample thin film 102 by analyzing using the received thermo-reflectance signal.

Figure 4:
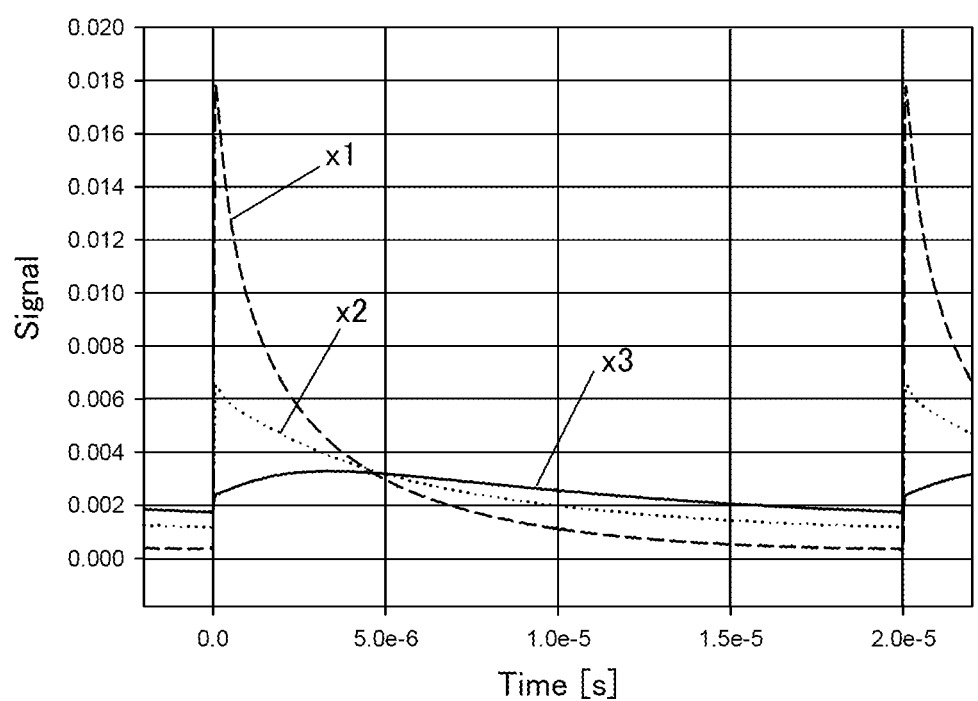
FIG. 4 is a diagram illustrating thermo-reflectance signals.

The signal observed by the thermo-reflectance method is a time response signal. FIG. 4 illustrates thermo-reflectance signals at positions where the coordinates in the x direction are x1, x2, and x3 as illustrated in FIGS. 2A, 2B, and 2C. The one indicating the fastest rise time of signal intensity is x1, and the one indicating the highest maximum signal intensity is also x1.

Figure 5:
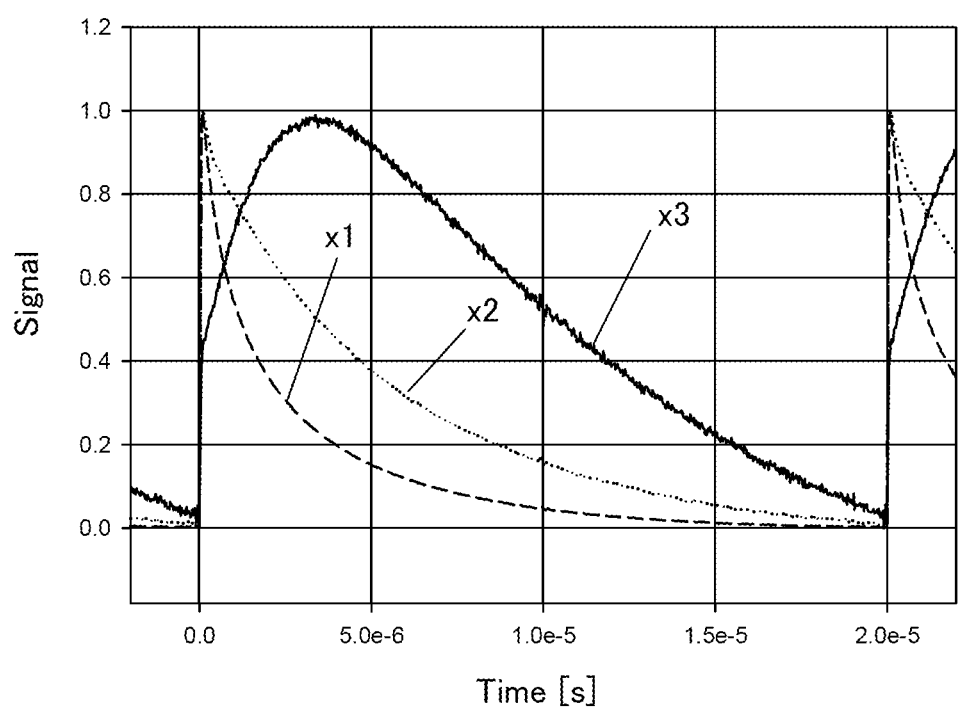
FIG. 5 is a diagram illustrating normalized thermo-reflectance signals.

To make it easier to understand the measurement position dependence of the thermo-reflectance signal illustrated in FIG. 4, FIG. 5 is a diagram illustrating values that are normalized by, within a time range corresponding to one period (20 µs) of the heating light, subtracting the minimum value of the signal intensity from a signal intensity at each time point, and then dividing the result by the maximum value.

The thermo-reflectance signal at the measurement point of x3, has a relative decrease in peak intensity at around 130 ns, but the signal intensity becomes the maximum in a relatively late time at around 3000 ns. Each signal indicates a temperature change due to heat diffusion in the in-plane direction of the sample thin film 102. The computer 28 can calculate heat diffusion time from the heating light irradiation position to each measurement position by analyzing these thermo-reflectance signals using a theoretical formula based on a heat diffusion equation, and calculate a thermo-physical property values including a thermal diffusivity based on the heat diffusion time.

As described above, in the present embodiment, the thermo-physical property measurement instrument 1 irradiates a sample 10 with heating light which is pulsed light output from the heating laser 22, as well as, irradiates the sample 10 with temperature measurement light which is continuous light output from the temperature measurement laser 23. Then, the computer 28 analyzes the thermo-reflectance signal obtained by AD-converting the detected signal of the reflected light of the temperature measurement light off the sample thin film 102. The light-shielding thin film 112 having an aperture 110 is provided facing the front surface of the sample thin film 102 opposite to the sample substrate 101. The sample 10 and the light shield 11 move in the in-plane direction while the center of the spot of the heating light and the center of the spot of the reflected light are at the same position in the in-plane direction. The heating light is applied through the aperture 110 of the light-shielding thin film 112, and the temperature measurement light is applied to a measurement position away from the irradiation position of the heating light by a predetermined distance. In this way, since a temperature change can be acquired based on the detected signal of the reflected light at each measurement position, a thermo-physical property value in the in-plane direction of the sample thin film 102 can be accurately and easily measured.

Embodiment 2

Embodiment 2 of the present disclosure will be described in detail with reference to the drawings. The configuration and operation of the thermo-physical property measurement instrument 1 are the same as those of Embodiment 1. The present embodiment differs in the configurations of the sample 10 and the light shield 11.

Figure 6A:
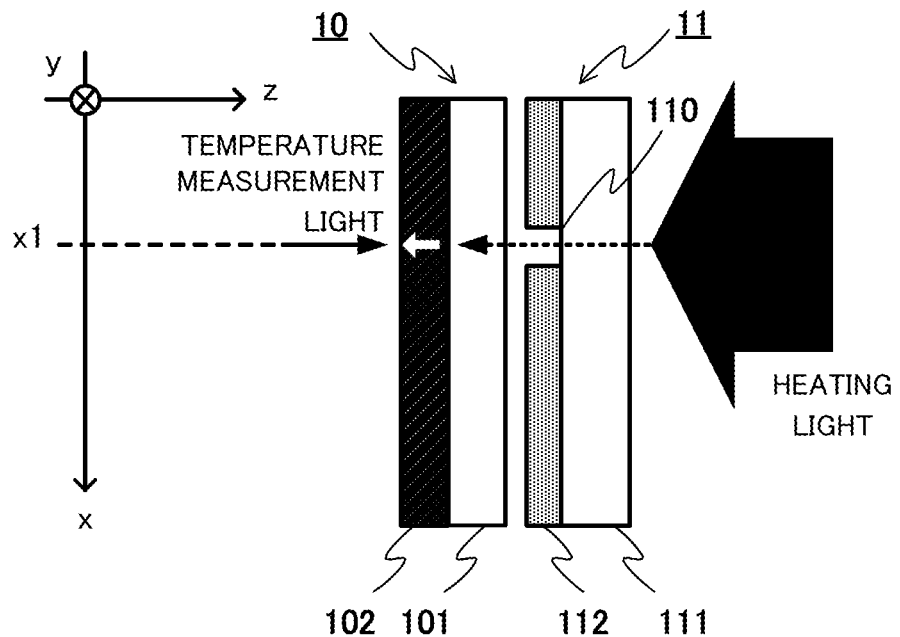
FIG. 6A is a diagram illustrating heating light and temperature measurement light applied to a sample and a light shield in Embodiment 2 of the present disclosure.
Figure 6B:
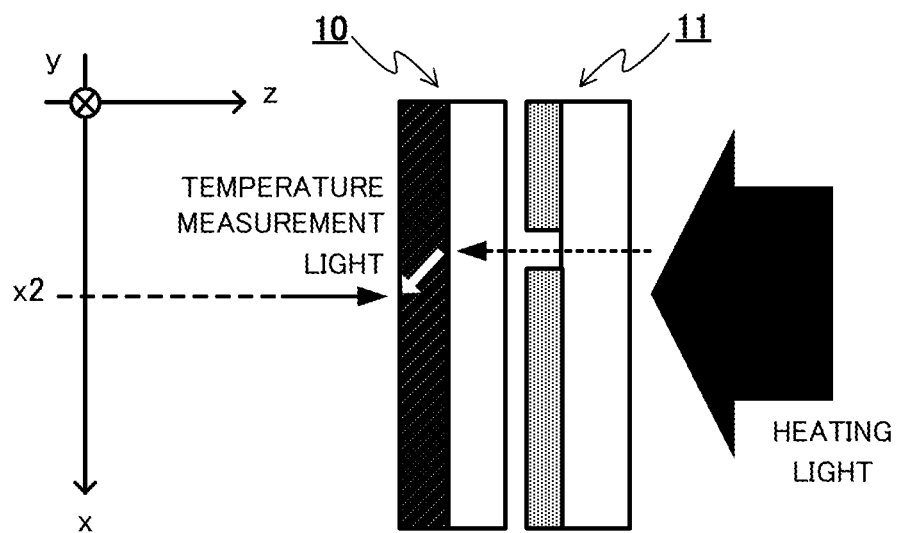
FIG. 6B is a diagram illustrating heating light and temperature measurement light applied to a sample and a light shield in Embodiment 2.
Figure 6C:
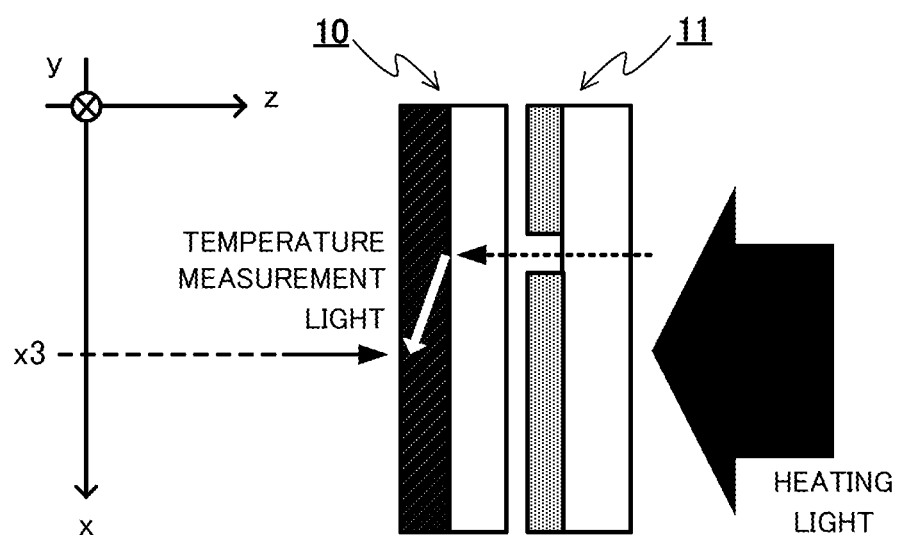
FIG. 6C is a diagram illustrating heating light and temperature measurement light applied to a sample and a light shield in Embodiment 2.

FIGS. 6A, 6B, and 6C are diagrams representing a sample 10, a light shield 11 arranged to face the sample 10, and heating light and temperature measurement light to be applied to the sample and the light shield. The configurations of the sample 10 and the light-shielding thin film 11 are similar to those of Embodiment 1, but are different in that the light-shielding thin film 112 of the light shield 11 faces the rear surface of the sample substrate 101 of the sample 10 opposite to the sample thin film 102.

That is, the rear surface of the sample substrate 101 and the surface of the light-shielding thin film 112 opposite to the transparent substrate 111 face each other. The sample substrate 101 and the light-shielding thin film 112 may be arranged in contact with each other.

As shown in FIGS. 6A, 6B, and 6C, the heating light that is output from the heating laser 22 proceeds toward a surface of the transparent substrate 111 opposite to the light-shielding thin film 112. The center of the spot of the heating light and the center of the spot of the temperature measurement light are at the same position in the in-plane direction. The heating light passes through the aperture 110 of the light-shielding thin film 112 to reduce the irradiation diameter, then, transmits the sample substrate 101 to be applied to the rear surface of the sample thin film 102. The temperature of the irradiation area on the sample thin film 102 instantly rises, and then the heat diffuses into the sample thin film 102. In FIGS. 6A, 6B and 6C, heat propagates in the direction of the white arrow.

The temperature measurement light output from the temperature measurement laser 23 is sufficiently focused by the lens 25, and is applied to the front surface of the sample thin film 102 opposite to the sample substrate 101 as illustrated in FIGS. 6A, 6B, and 6C. Since the reflectance of the temperature measurement light is proportional to a temperature change, the thermo-physical property measurement instrument 1 observes a change in the temperature of the front surface of the sample thin film 102 based on a change in the reflectance of the temperature measurement light. The temperature change caused by one pulse of the heating light is approximately 0.1° C.

The diameter of the spot of the heating light applied to the light-shielding thin film 112 is sufficiently larger than the diameter of the spot of the temperature measurement light applied to the sample thin film 102. By driving the XY stage while maintaining the centers of the spots of the heating light and the temperature measurement light at the same position in the in-plane direction, the positions of the sample 10 and the light shield 11 move in the x direction or y direction. FIGS. 6A, 6B, and 6C illustrate cases where the positions of the sample 10 and the light shield 11 are moved in the x direction.

As illustrated in FIGS. 6A, 6B, and 6C, when the sample 10 and the light shield 11 are moved by a distance smaller than the radius of the spot of the heating light, the irradiation position of the heating light on the sample thin film 102 stays the same since the heating light is applied through the aperture 110. On the other hand, the irradiation position of the temperature measurement light changes by the moved distance. In FIGS. 6A, 6B, and 6C, the irradiation position of the temperature measurement light is changed to x1, x2, and x3.

Thus, by integrally moving the sample 10 and the light shield 11, the distance between the irradiation position of the heating light and the irradiation position of the temperature measurement light can be changed. Note that the diameter of the spot of the temperature measurement light needs to be sufficiently small to be able to distinguish a change in distance between the irradiation position of the heating light and the irradiation position of the temperature measurement light. For example, the lens 25 focuses the spot of the temperature measurement light on the sample thin film 102 to a size smaller than a circle of 3 µm in diameter.

The reflected light of the temperature measurement light is incident in the photodetector 26 and converted into an electrical signal, then, converted to a digital signal by the AD converter 27. The thermo-reflectance signal that is output from the AD converter 27 is transmitted to the computer 28 as a temperature response signal. The computer 28 calculates a thermo-physical property value of the sample thin film 102 by analyzing the received thermo-reflectance signal.

As described above, in the present embodiment, a light-shielding thin film 112 having an aperture 110 is provided facing a surface, opposite to the sample thin film 102, of the sample substrate 101 of the sample 10 and heating light proceeds through the aperture 110 of the light-shielding thin film 112 for irradiation. The sample 10 and the light shield 11 move in the in-plane direction while the center of the spot of the heating light and the center of the spot of the reflected light are at the same position in the in-plane direction. The heating light is applied through the aperture 110 of the light-shielding thin film 112, and the temperature measurement light is applied to a measurement position a predetermined distance away from the irradiation position of the heating light. In this way, since temperature measurement light can be directly applied to each measurement position on the sample thin film 102 and a temperature change can be acquired based on the detected signal of the reflected light of the measurement light, a thermo-physical property value in the in-plane direction of the sample thin film 102 can be accurately and easily measured.

Embodiment 3

Figure 7:
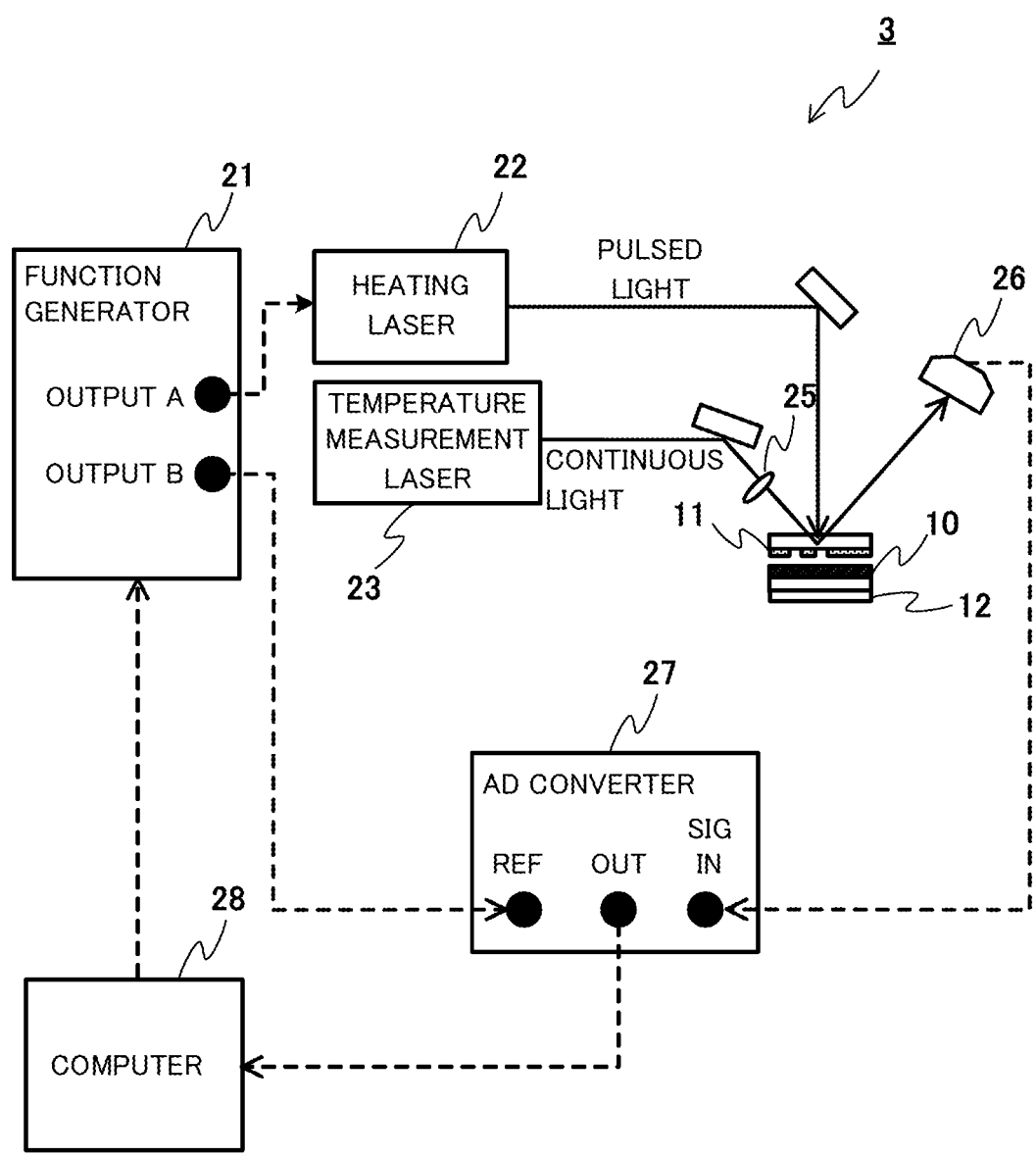
FIG. 7 is a diagram illustrating the configuration of a thermo-physical property measurement instrument according to Embodiment 3 of the present disclosure.

Embodiment 3 of the present disclosure will be described in detail with reference to the drawings. FIG. 7 is a diagram illustrating the configuration of a thermo-physical property measurement instrument 3 according to Embodiment 3. In the present embodiment, the thermo-physical property measurement instrument 3 measures a temperature response using a thermo-reflectance method that irradiates the front surface of a sample 10 with heating light, which is pulsed light, then, irradiates the front surface with temperature measurement light, which is continuous light, and detects the reflected light of the temperature measurement light.

The thermo-physical property measurement instrument 3 according to the present embodiment includes a function generator 21, a heating laser 22, a temperature measurement laser 23, a lens 25, an XY stage 12, a photodetector 26, an AD converter 27, and a computer 28 similar to those of Embodiment 1. In this embodiment, as illustrated in FIG. 7, the irradiation direction of the temperature measurement light applied to the sample 10 is different from that of Embodiment 1.

Figure 8:
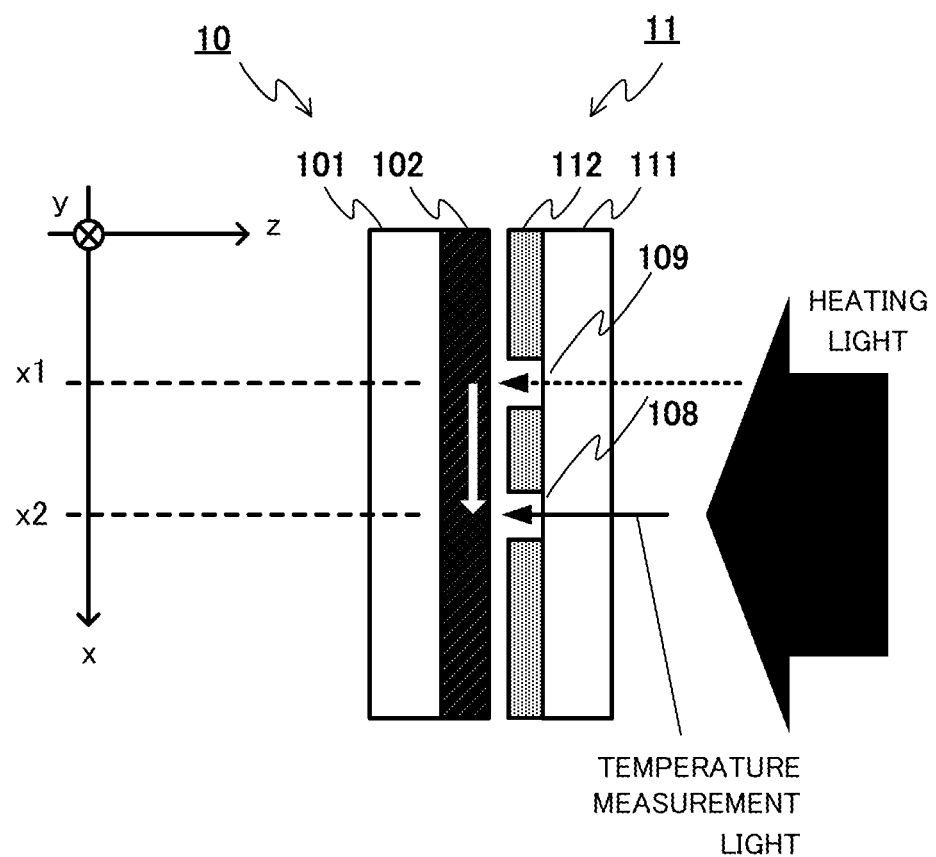
FIG. 8 is a diagram illustrating heating light and temperature measurement light applied to a sample and a light shield in Embodiment 3.

FIG. 8 is a diagram representing a sample 10, a light shield 11 arranged to face the sample 10, and heating light and temperature measurement light to be applied to the sample 10 and the light shield 11. The sample 10 has a similar configuration to that of Embodiment 1, including a sample substrate 101 and a sample thin film 102. Note that, while the sample substrate 101 is made of a material that transmits heating light or temperature measurement light in Embodiment 1, in the present embodiment, the sample substrate 101 may be made of a material that does not transmit heating light or temperature measurement light.

The light shield 11 has two or more apertures and has a function of shielding from light except for the apertures. In the present embodiment, a case where two apertures 108 and 109 are provided will be described. The light shield 11 includes a light-shielding thin film 112 that is formed by depositing an arbitrary substance having a light shielding property on a transparent substrate 111, in which the light-shielding thin film 112 is, for example, a metal thin film, such as platinum. The transparent substrate 111 is made of a material that transmits heating light and temperature measurement light. The method of manufacturing the light shield 11 is the same as that of Embodiment 1. Each of the apertures 108, 109 has a predetermined shape and size. In FIG. 8, the x-coordinates of the centers of the apertures 108 and 109 are x1 and x2, respectively. The light-shielding thin film 112 may be arranged in contact with the sample thin film 102.

The heating laser 22 is a fiber laser that outputs pulsed light of 1 ns in pulse width according to an electrical signal that is input from the function generator 21. The heating light that is output from the heating laser 22 is applied to a surface of the transparent substrate 111 opposite to the light-shielding thin film 112. The temperature measurement light that is output from the temperature measurement laser 23 is focused by the lens 25 and applied to a surface of the transparent substrate 111 opposite to the light-shielding thin film 112. That is, the irradiation directions of the heating light and the temperature measurement light are the same. Note that the lens 25 focuses the temperature measurement light to a size smaller than a circle having a diameter of 3 μm.

As illustrated in FIG. 8, the diameter of the spot of the heating light applied to the light-shielding thin film 112 is sufficiently larger than the diameter of the spot of the temperature measurement light applied to the light-shielding thin film 112. The heating light can pass through both of the two apertures 108, 109. The center of the spot of the heating light and the center of the spot of the temperature measurement light may be at the same position in the in-plane direction.

The operation of the thermo-physical property measurement instrument 3 configured as above will be described. The thermo-physical property measurement instrument 3 according to the present embodiment performs measurement in a front heating/front detection (FF) configuration in which both heating light and temperature measurement light are applied to the front surface of the sample thin film 102 of the sample 10 via the light shield 11.

An electrical signal with a repetition period of 20 μs is output from the output A terminal of the function generator 21. The output signal of the output B has a certain delay to the output signal of the output A, and is output to the AD converter 27. Based on the electrical signal that was output from the output A of the functional generator 21, the heating laser 22 outputs heating light with a pulse width of 1 ns and a repetition period of 20 μs.

The heating light that was output from the heating laser 22 proceeds toward a surface of the transparent substrate 111 opposite to the light-shielding thin film 112. The center of the spot of the heating light applied to the light-shielding thin film 112 is the center of the aperture 108. Since the spot diameter is sufficiently large, the heating light passes through the apertures 108 and 109 and is applied to the front surface of the sample thin film 102. That is, in FIG. 8, the irradiation area of the heating light on the sample thin film 102 is regions centering on x-coordinates of x1 and x2. The temperatures of the irradiated regions on the sample thin film 102 instantly rise, and then, the heat diffuses into the sample thin film 102.

On the other hand, the temperature measurement light that was output from the temperature measurement laser is sufficiently focused by the lens 25, and passes only through the aperture 108 and is applied to the front surface of the sample thin film 102. A change in the reflected light intensity of the temperature measurement light of the sample thin film 102 over time is expressed as the sum of the temperature change at the position x2 caused by the heating light passing through the aperture 108 and the temperature change at the position x2 as a result of the heating light passing through the aperture 109 causing a temperature rise and the following diffusion of the heat as indicated by the white arrow.

The temperature change at the position x2 caused by the heating light passing through the aperture 108 is a temperature change on the sample surface that is caused by diffusion of the heat in the film thickness direction of the sample thin film 102, and the temperature change can be obtained by measuring temperature when the sample thin film 102 is directly heated without installing the light shield 11. Thus, the temperature change at the position x2 caused by the heating light passing through the aperture 109 causing a temperature rise and the following diffusion of the heat, can be calculated as a difference between a change in the reflectance of the temperature measurement light with the light shield 11 as indicated in FIG. 8 and a change in the reflectance of the temperature measurement light that was measured without installing the light shield 11.

The temperature response signal at the position x2 caused by the heating light passing through the aperture 109 thus obtained is the thermo-reflectance signal of the present embodiment. By analyzing the obtained thermo-reflectance signal, the computer 28 can calculate the thermo-physical property values including a thermal diffusivity in the in-plane direction of the sample thin film 102.

Note that, although the configuration having two apertures 108 and 109 has been described in FIG. 8, another one or more apertures may be provided apart from each other in the in-plane direction. In such a case, the thermo-reflectance signal at another position can be acquired by moving the XY stage 12, on which the sample 10 and the light shield 11 are fixed, with the centers of the spots of the heating light and temperature measurement light coincided, to set the centers of the spots of the heating light and the temperature measurement light at the center of another aperture. Based on the obtained thermo-reflectance signal, knowledge of the thermo-physical property value in the in-plane direction can be obtained in more detail.

Further, although the case where the centers of the spots of the heating light and temperature measurement light coincide at the position x2 is illustrated in FIG. 8, the center of the spot of the heating light may be set to x1 and the center of the spot of the temperature measurement light, x2. In such a case, the heating light can also pass through the aperture 108 at the position x2. That is, the center of the spot of the heating light may be either x1 or x2. In other words, the light-shielding thin film 112 has two or more apertures in the present embodiment; heating light is applied to a region including at least one aperture 109; and the temperature measurement light is focused and applied to a measurement position that is at the same position in the in-plane direction as the other aperture 108. At this time, the sample thin film 102 may simultaneously have a region where both the heating light and the temperature measurement light are applied and a region where either the heating light or the temperature measurement light is applied.

Further, although the light-shielding thin film 112 faces the sample thin film 102 of the sample 10 in FIGS. 7 and 8, the light-shielding thin film 112 may face a surface of the sample substrate 101 opposite to the sample thin film 102 as in Embodiment 2. In such a case, the heating light and the temperature measurement light passes through the aperture 110 of the light-shielding thin film 112, penetrates the sample substrate 101, and is applied to the sample thin film 102.

As described above, in the present embodiment, the thermo-physical property measurement instrument 3 irradiates a surface of the light-shielding thin film 112 opposite to the sample thin film 102 with the heating light and the temperature measurement light. The light-shielding thin film 112 has two or more apertures including apertures 108 and 109. The heating light passes through both the apertures 108 and 109 to heat the sample thin film 102, and the temperature measurement light passes only through the aperture 108 and is reflected off the sample thin film 102. The computer 28 analyzes a thermo-reflectance signal that was obtained based on the obtained reflected light of the temperature measurement light. As such, even in the front heating/front detection configuration, a thermo-physical property value in the in-plane direction of the sample thin film 102 can be accurately measured.

Examples

Figure 9:
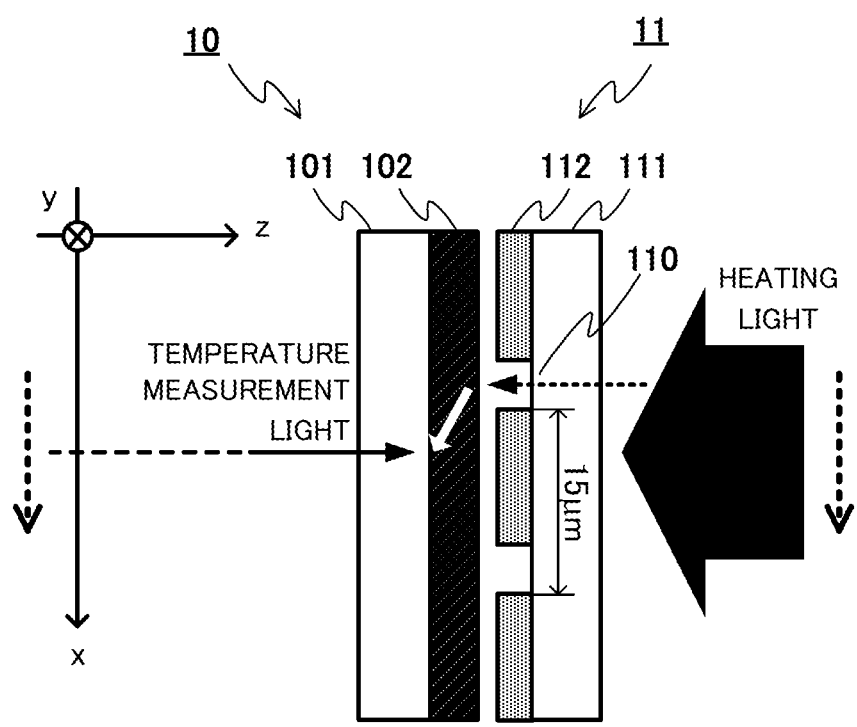
FIG. 9 is a diagram illustrating heating light and temperature measurement light applied to a sample and a light shield in Examples.

With the thermo-physical property measurement instrument 1 of the configuration illustrated in Embodiment 1, the computer 28 acquired and analyzed a thermo-reflectance signal that was obtained by applying heating light and temperature measurement light to a sample 10 in which a sample thin film 102 of titanium nitride is formed on a sample substrate 101. Here, as illustrated in FIG. 9, the light shield 11 has a wire structure in which strips of light-shielding thin film 112 of platinum (Pt) are formed at intervals of 15 μm on a transparent substrate 111, the strips having a slit therebetween. The diameter of the spot of the heating light is about 30 μm, which is approximately twice the period of the wire structure, 15 μm.

In this Example, the heating light is applied to the sample thin film 102 through two linear apertures adjacent to a strip of light-shielding thin film. In the inner portion of the two linearly heated regions, the heat is assumed to diffuse one-dimensionally in the film thickness direction and the in-plane direction, respectively. In particular, when the thermal diffusivity of the sample substrate 101 is smaller than that of the sample thin film 102, an approximation of one-dimensional heat conduction in the in-plane direction is well established. Further, when linear heating is performed, compared to point heating where heat diffuses three-dimensionally, the temperature decrease caused by an increase in the distance between the heating position and the temperature measurement position is gradual, which makes it easier to detect signals.

Figure 10:
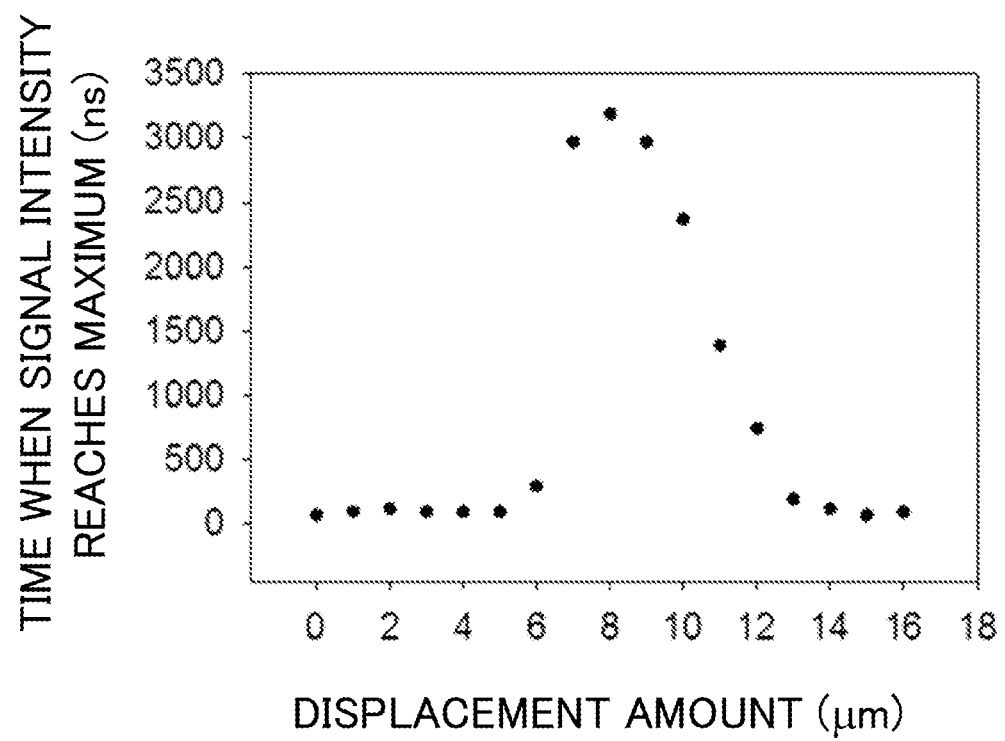
FIG. 10 is a graph illustrating time the signal intensity takes to reach maximum for a displacement amount of a measurement position in Examples.

FIG. 10 illustrates the result of measurement conducted by changing a position to be irradiated with temperature measurement light within one section of 15 μm. The displacement amount in the horizontal axis is a value with the center of the slit as the aperture 110 set to 0 μm. The vertical axis is the time when the signal intensity of a normalized thermo-reflectance signal as illustrated in FIG. 5 reaches the maximum. As illustrated in FIG. 9, when the displacement amount is changed, the time the signal intensity takes to reach maximum is symmetrical around a measurement point at which the displacement amount is 8 μm, equivalent to half the cycle of the wire structure.

This can be interpreted as detecting a temperature rise due to heat transfer derived from the heating light passing through the aperture 110 closest to the irradiation position of the temperature measurement light. Note that, the actual maximum signal intensity is the smallest at the measurement point at which the displacement amount is 8 μm where the time the signal intensity takes to reach maximum is the longest. In other words, since the time the signal intensity takes to reach maximum is the longest, as well as, the maximum signal intensity is the least at the measurement point where the displacement amount is 8 μm, it is assured that the heating light and the temperature measurement light are applied to positions that are separated from each other by a predetermined distance on the light shield 11. Further, when the light shield 11 includes three or more apertures 110 and heating light passes through each aperture 110, the effect of an aperture 110 after the third aperture can be handled by an analysis method similar to the one that is used with one-dimensional heat diffusion in the film thickness direction, which has been conventionally used.

In this way, by detecting a signal by a thermo-reflectance method that uses a sample 10 that faces a light shield 11 of a predetermined template, which is then heated by partially shielded heating light, knowledge on the heat diffusion in the in-plane direction of the sample thin film 102 can be obtained. For example, when a sample thin film 102 has in-plane anisotropy, it is possible to easily measure a thermal diffusivity of a desired direction by rotating the installing orientation of a light shield 11 having a slit-shaped aperture 110 when installing the light shield 11 on the sample thin film 102 and performing measurement.

Further, by performing measurement using a light shield 11 of the same template, a magnitude relationship between heat diffusion time in the in-plane direction of a sample thin film 102 to be measured and heat diffusion time in the in-plane direction of a standard sample can be determined. In addition, thermo-physical property values including a thermal diffusivity can be obtained through a theoretical calculation based on changes in the thermo-reflectance signal over time at each measurement point.

As described above, according to the present disclosure, a sample thin film provided with a light shield that shields from light except for an aperture is irradiated with repeated pulsed heating light passing through the aperture of the light-shield; then, the sample thin film is irradiated with temperature measurement light at a measurement position that is a predetermined distance away in an in-plane direction along an extending direction of the front surface from the heating light irradiation position on the sample; and a thermo-physical property value in the in-plane direction of the sample thin film is calculated based on the reflected light intensity of the reflected light of the temperature measurement light off the sample thin film. This makes it possible to accurately and easily measure a thermo-physical property value in the in-plane direction of the sample thin film.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

Figure 11:
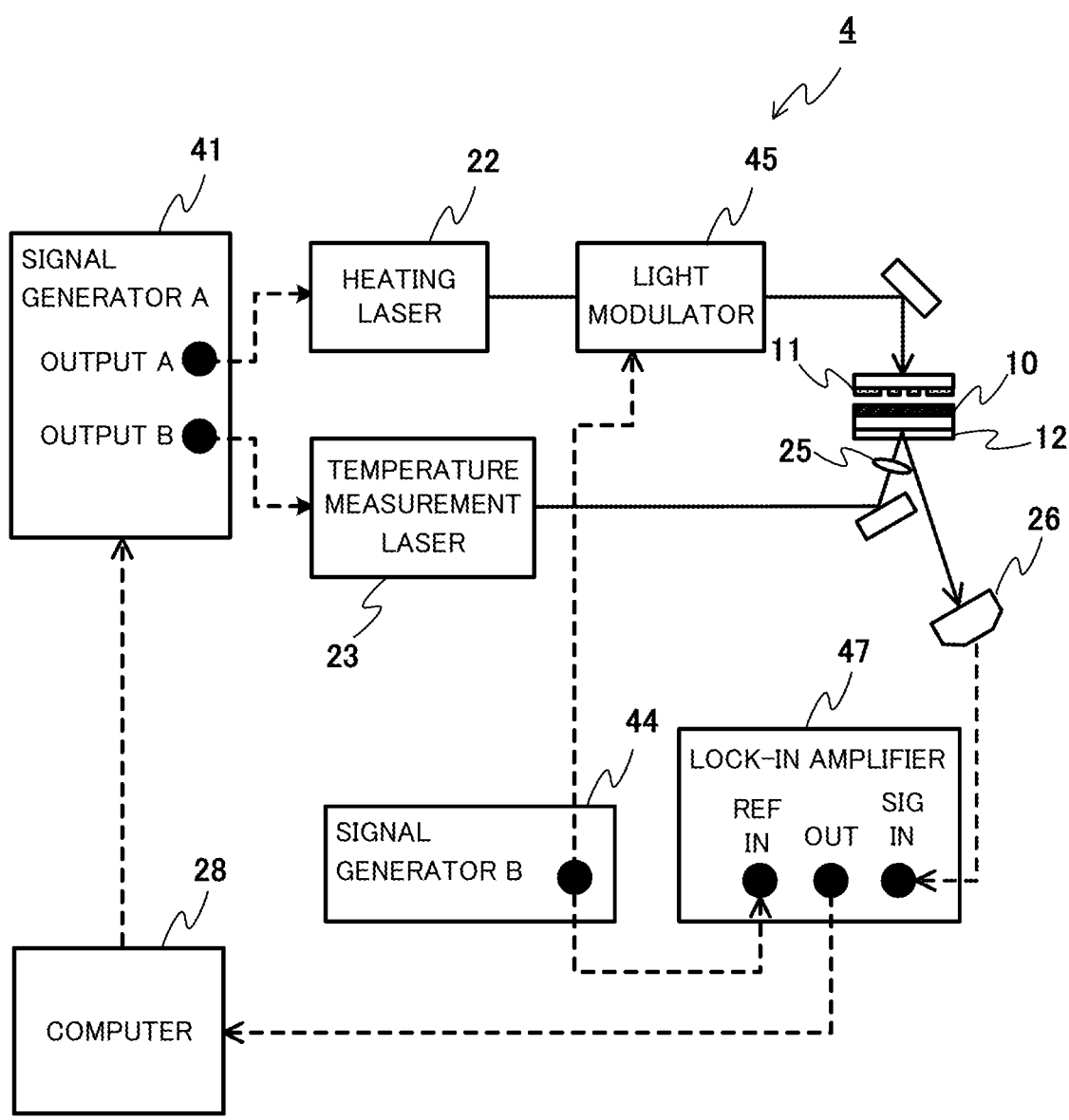
FIG. 11 is a diagram illustrating the configuration of a thermo-physical property measurement instrument according to another example of the present disclosure.
Figure 12:
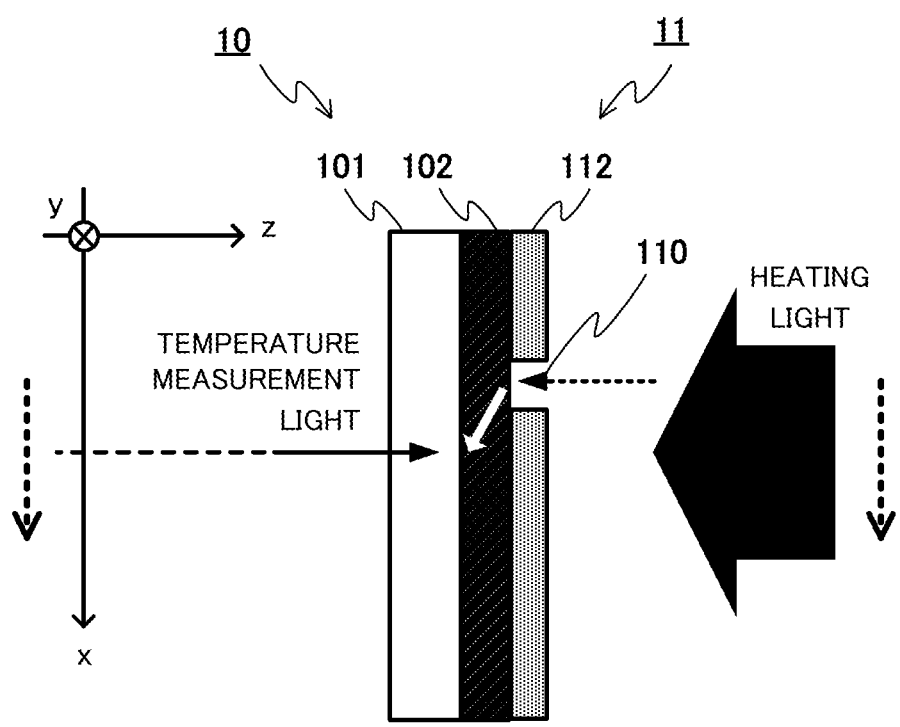
FIG. 12 is a diagram illustrating heating light and temperature measurement light applied to a sample and a light shield in another example of the present disclosure.

For example, although the temperature measurement light is continuous light in the above embodiments, the temperature measurement light may be pulsed light. FIG. 11 illustrates the configuration of a thermo-physical property measurement instrument 4 in which the temperature measurement light is pulsed light. In the thermo-physical property measurement instrument 4, the heating laser 22 and the temperature measurement laser 23 are pulse-driven by an electrical signal generated by a signal generator (SG) A 41, and output pulsed light on the order of nanoseconds. The heating light of pulsed light is intensity-modulated by a light modulator 45 based on an electrical signal generated by a signal generator (SG) B 44, and is applied to a sample 11. On the other hand, the temperature measurement light of pulsed light is focused by a lens 25 and applied to the sample 11. Among the outputs of the photodetector 26 that detects the reflected light of the temperature measurement light, a component of modulation frequency that is equal to the modulation frequency of the light modulator 45 is amplified by a lock-in amplifier 47 and output to a computer 28 as a thermo-reflectance signal. In this way, the thermo-physical property measurement instrument 4 can measure a thermo-physical property value more accurately based on the thermo-reflectance signal with reduced noise.

Further, although the heating light is pulsed light on the order of nanoseconds in the above embodiments, pulsed light on the order of picoseconds or femtoseconds may also be used. When the heating light is pulsed light on the order of picoseconds, the temperature measurement light is also pulsed light on the order of picoseconds. When the heating light is pulsed light on the order of femtoseconds, the temperature measurement light is also pulsed light on the order of femtoseconds. At this time, using the drive signal of the signal generator A 41, the temperature measurement light irradiation time during which the sample thin film 102 is irradiated with the temperature measurement light is controlled to be delayed from the heating light irradiation time during which the sample thin film 102 is irradiated with the heating light. The thermo-physical property measurement instrument 4 calculates heat diffusion time based on the time difference between the heating light irradiation time and the temperature measurement light irradiation time. This makes it possible to obtain knowledge on heat diffusion in a shorter time domain.

Figure 13:
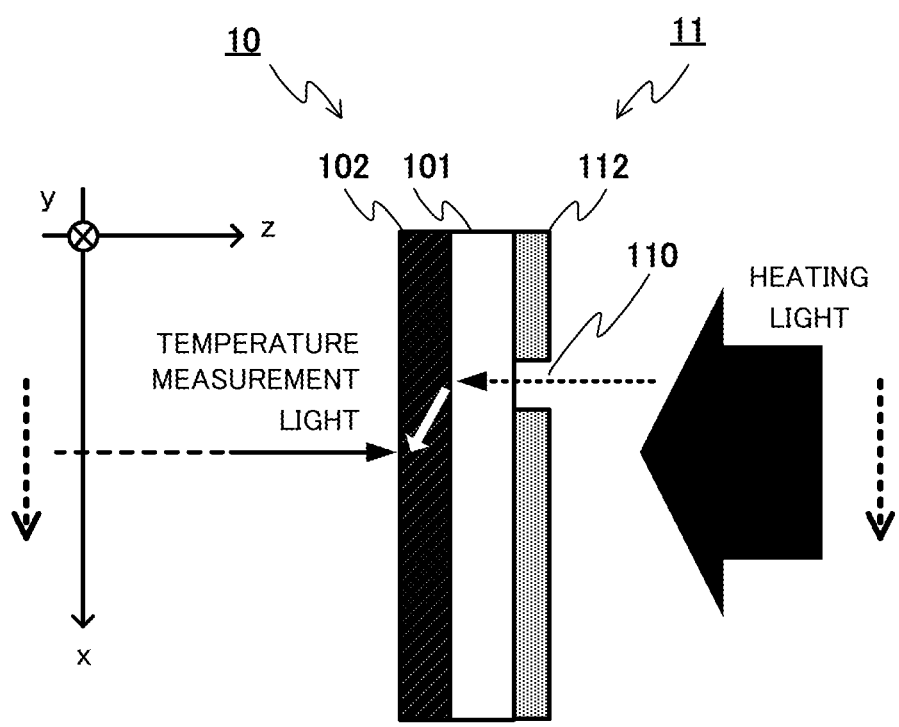
FIG. 13 is a diagram illustrating heating light and temperature measurement light applied to a sample and a light shield in another example of the present disclosure.

Furthermore, although the light shield 11 is formed by depositing a light-shielding thin film 112 on a transparent substrate 111 in the above embodiments, the light-shielding thin film 112 may be formed by directly depositing a material having a light-shielding property on the front surface of the sample thin film 102 of the sample 10. Alternatively, as illustrated in FIG. 13, a light-shielding thin film 112 may be formed by directly depositing a material having a light-shielding property on a surface of the sample substrate 101 of the sample 10 opposite to the sample thin film 102.

Although the thermo-physical property measurement instrument 1, 3, 4 measures a sample 10 having a sample thin film 102 deposited on a sample substrate 101 in the above embodiments, it is also possible to measure a sample thin film 102, which is a free-standing film that does not have a sample substrate 101.

Although the sample thin film 102 is irradiated with heating light directly or through the sample substrate 101 in the above embodiments, the front surface or rear surface of the sample thin film 102 may be further provided with a thin film to enhance absorption or reflection of light. The thin film here is a thin film different from the light-shielding thin film 112.

The present application claims the benefit of Japanese Patent Application No. 2019-114439 filed on Jun. 20, 2019, the entire disclosure of which is incorporated by reference herein.

The invention claimed is:

1. A thermo-physical property measurement instrument comprising:
    a light shield that includes an aperture and is provided facing a front surface or a rear surface of a sample thin film and shields the sample thin film from light except for the aperture;
    a heating laser that irradiates the sample thin film with repeated pulsed heating light through the light shield;
    a temperature measurement laser that applies temperature measurement light to a measurement position that is a predetermined distance away in an in-plane direction along an extending direction of the front surface from a heating light irradiation position on the sample thin film irradiated with the heating light through the aperture;
    a photodetector that detects reflected light of the temperature measurement light off of the sample thin film; and
    a thermo-physical property value calculator that calculates a thermo-physical property value in the in-plane direction of the sample thin film based on a reflected light intensity of the reflected light detected by the photodetector, wherein
    a diameter of a spot of the heating light applied to the light shield is larger than a diameter of a spot of the temperature measurement light on the sample thin film,
    in the in-plane direction, a center of the spot of the temperature measurement light is included in the spot of the heating light, and
    the measurement position is separated from the heating light irradiation position by the predetermined distance by moving the light shield having the aperture and the sample thin film in the in-plane direction.

2. The thermo-physical property measurement instrument according to claim 1, wherein
    a center of the spot of the heating light and the center of the spot of the temperature measurement light are at a same position in the in-plane direction, and
    the measurement position is separated from the heating light irradiation position by the predetermined distance by shifting the aperture of the light shield from the center of the spot of the heating light and the center of the spot of the temperature measurement light.

3. The thermo-physical property measurement instrument according to claim 1, wherein
    the light shield is formed by depositing a light-shielding thin film having a light shielding property except for the aperture on a transparent substrate made of a material that transmits the heating light,
    the light-shielding thin film on the transparent substrate is positioned to face the front surface of the sample thin film, and
    the heating laser irradiates the side of the transparent substrate with the heating light.

4. The thermo-physical property measurement instrument according to claim 1, wherein
    the sample thin film is a thin film deposited on a sample substrate, the light shield is formed by depositing a light-shielding thin film having a light shielding property on a transparent substrate except for the aperture, the light-shielding thin film on the transparent substrate is positioned to face a surface of the sample substrate opposite to the sample thin film, and the heating laser irradiates the side of the transparent substrate with the heating light.

5. The thermo-physical property measurement instrument according to claim 1, wherein the light shield is formed by depositing a light-shielding thin film having a light shielding property on the front surface of the sample thin film, and the heating laser irradiates the light shield on the front surface of the sample thin film with the heating light.

6. The thermo-physical property measurement instrument according to claim 1, wherein the sample thin film is a thin film deposited on a sample substrate, the light shield is formed by depositing a light-shielding thin film having a light shielding property on a rear surface of the sample substrate opposite to the sample thin film, and the heating laser irradiates the light shield on the rear surface of the sample substrate with the heating light.

7. The thermo-physical property measurement instrument according to claim 1, wherein the thermo-physical property value calculator calculates a heat diffusion time of the sample thin film from the heating light irradiation position to the measurement position based on the reflected light intensity, and calculates the thermo-physical property value including a thermal diffusivity based on the heat diffusion time.

8. The thermo-physical property measurement instrument according to claim 1, wherein the temperature measurement light is focused and applied to the measurement position located on a surface of the sample thin film opposite to the light shield.

9. The thermo-physical property measurement instrument according to claim 1, wherein the light shield has two or more apertures separated from each other, the heating light and the temperature measurement light are both applied to the sample thin film through the light shield, the heating light is applied to a region including at least one of the apertures, and the temperature measurement light is focused and applied to the measurement position at a same position in the in-plane direction as another one of the apertures.

10. The thermo-physical property measurement instrument according to claim 1, wherein, the measurement position is changed by moving a stage on which the sample thin film provided with the light shield is fixed in a two-dimensional direction parallel to the in-plane direction, and the thermo-physical property value calculator calculates the thermo-physical property value in the in-plane direction based on the reflected light intensity reflected off the measurement position.

11. The thermo-physical property measurement instrument according to claim 1, wherein the heating light is pulsed light having a pulse width on the order of nanoseconds, picoseconds or femtoseconds.

12. The thermo-physical property measurement instrument according to claim 11, wherein the temperature measurement light is continuous light.

13. The thermo-physical property measurement instrument according to claim 11, wherein the temperature measurement light is pulsed light having a pulse width on the order of nanoseconds, picoseconds or femtoseconds.

14. The thermo-physical property measurement instrument according to claim 13, further comprising:

a signal generator that outputs drive signals to the heating laser and the temperature measurement laser, wherein the thermo-physical property measurement instrument controls a heating light irradiation time to irradiate the sample thin film with the heating light and a temperature measurement light irradiation time to irradiate the sample thin film with the temperature measurement light using a drive signal of the signal generator, and the thermo-physical property value calculator calculates a heat diffusion time based on a time difference between the heating light irradiation time and the temperature measurement light irradiation time and calculates the thermo-physical property value including a thermal diffusivity based on the heat diffusion time.

15. The thermo-physical property measurement instrument according to claim 1, wherein the light shield has a light-shielding thin film of a metal material that is deposited except for the aperture.

16. A thermo-physical property measurement method comprising:

a heating light irradiation step for irradiating a sample thin film with repeated pulsed heating light through a light shield that includes an aperture and is provided facing a front surface or rear surface of the sample thin film and shields the sample thin film from light except for the aperture;

a temperature measurement light irradiation step for applying temperature measurement light to a measurement position that is a predetermined distance away in an in-plane direction along an extending direction of the front surface from a heating light irradiation position on the sample thin film irradiated with the heating light through the aperture;

a light detection step for detecting reflected light of the temperature measurement light off of the sample thin film; and a thermo-physical property value calculation step for calculating a thermo-physical property value in the in-plane direction of the sample thin film based on a reflected light intensity of the reflected light detected at the light detection step, wherein a diameter of a spot of the heating light applied to the light shield is larger than a diameter of a spot of the temperature measurement light on the sample thin film, in the in-plane direction, a center of the spot of the temperature measurement light is included in the spot of the heating light, and in the temperature measurement light irradiation step, the measurement position is separated from the heating light irradiation position by the predetermined distance by moving the light shield having the aperture and the sample thin film in the in-plane direction.

* * * * *